(12) United States Patent
Gueorguieva et al.

(10) Patent No.: US 9,049,306 B1
(45) Date of Patent: Jun. 2, 2015

(54) APPARATUS AND METHODS FOR REMOTE CONTROL OF ACCESS TO FACILITIES

(76) Inventors: Nadejda V. Gueorguieva, Lomita, CA (US); Thomas R. Richmond, Santa Ana, CA (US); Suzanne Richmond, San Pedro, CA (US); Patrick S. Kochie, Simi Valley, CA (US); Yu Jennifer Cheng, Santa Monica, CA (US); Eitan T. Bear, Santa Monica, CA (US)

( * ) Notice: Subject to any disclaimer, the term of this patent is extended or adjusted under 35 U.S.C. 154(b) by 1079 days.

(21) Appl. No.: 12/325,254

(22) Filed: Nov. 30, 2008

(51) Int. Cl.
  *H04M 11/00* (2006.01)
  *H04M 11/02* (2006.01)

(52) U.S. Cl.
  CPC .................... *H04M 11/025* (2013.01)

(58) Field of Classification Search
  CPC .................................................. H04M 11/025
  USPC .............. 379/102.06; 340/5.2–5.74
  See application file for complete search history.

(56) References Cited

U.S. PATENT DOCUMENTS

| | | | |
|---|---|---|---|
| 2003/0065777 A1* | 4/2003 | Mattila et al. | 709/225 |
| 2004/0160309 A1* | 8/2004 | Stilp | 340/10.2 |
| 2007/0064897 A1* | 3/2007 | Lee | 379/159 |
| 2009/0051484 A1* | 2/2009 | Foster et al. | 340/5.7 |

* cited by examiner

*Primary Examiner* — Sonia Gay (57) ABSTRACT

Apparatus and methods are disclosed for simplifying and improving the reliability of communication between end users and access control systems such as those that include door and/or gate controllers, tenant access to buildings, and the like. In certain embodiments using an analog modem at the controller end of the system, the corresponding remote analog modem (which communicates with that analog modem at the controller end) is not within the direct control of the end user, and the end user's communicates instead via the user's standard hardware/software for communicating generally, such as via the Internet. Depending on the application, the control data can be maintained and/or synched at any selected combination or sub-combination of several locations: (1) the user's local system; (2) an intermediate server system; and/or (3) the controller end system. Preferred communication connections between the components provide improved ease of installation and use and reliability, as compared to prior art systems in which an end user's analog modem must be configured to directly communicate with a corresponding analog modem on a selected control device (such as a gate or door controller). Corresponding telephone/voice control preferably is also provided within the system, via POTS, a cellular telephone connection, VoIP, etc.

6 Claims, 8 Drawing Sheets

APPARATUS AND METHODS FOR REMOTE CONTROL OF ACCESS TO FACILITIES

FIELD OF THE INVENTION

The present invention relates generally to electronic data transfer, remote communication, and systems for controlling access to facilities. More particularly, the present invention relates to a remote control and programming system that provides for, among other things, electronic data transfer between (a) an end-user's computer (or Internet-enabled device or similar system) and (b) a remote target "controlled" system (such as a gate controller, door controller, or the like at an apartment complex or other building or location). Among other things, the invention provides improved methods and apparatus to remotely control access to secured locations, through one or more entry points into those locations. The invention is especially useful for remote targets (such as a telephone entry system, or "TES") that use an analog modem for communicating the relevant control data.

INCORPORATION BY REFERENCE

The contents of any U.S. patent or other reference cited in this application is incorporated herein by reference, as if set forth in full.

BACKGROUND OF THE INVENTION

Modern facilities often need and/or use some form of an electronic/remote/automated system to control entrance/access to the facility. By way of examples, and not by way of limitation, such facilities include apartment complexes, gated communities, condominium buildings, college resident halls, office buildings, factories, industrial sites, and other secured locations. Among other things, such access control systems can provide a necessary or helpful level of security for the controlled area/building, as well as other benefits.

Also by way of example but not by way of limitation, one type of access control system commonly in use is known as a telephone entry system (TES). These TES access control systems include at least one telephone line operatively connected to the system. Among other applications, these systems are commonly mounted adjacent the entrances of buildings and/or at vehicle gates into complexes, and the telephone line permits visitors to dial a resident within the complex and permits that resident to enter a code (such as by pressing a number on their telephone) to open the controlled gate and/or unlock the controlled door, etc. at which the visitor is waiting.

In addition to enabling tenants to remotely open a gate/door for a visitor, such systems can provide security and access control in other ways. For example, tenants commonly are given passcodes (which can be entered at a keypad on or near the entry), proximity cards, remote "rolling code" transceivers, or other devices. These are some of the wide variety of technologies that exist and/or are being developed to allow those tenants (or other persons to whom such authorization and/or devices are given) access to a particular facility, building, complex, community, or similar location.

Such access control systems can control entry at one or more entry points (for example, doors, garage doors, gates, and similar structures) associated with a particular secured location, complex, or facility. The access control system may also monitor the connected/controlled entry points for unauthorized access, keep records of persons entering or leaving a secured area, and/or perform other functions.

Such controlled installations commonly involve a plurality of tenants, residents, visitors, vendors, or other users who need access into and/or out of a controlled area. Each of these authorized users can have associated codes/passwords/signaling devices/telephone numbers (for visitors to dial to request entry), and/or other data that must be available to enable the convenient and desired entry and exit in the secured area, while maintaining the desired security. Both the users and their control devices and related information can be varied and changing, such as when tenants move out and/or into the facility.

To manage all of that information, these systems typically include an electronic database. In many early systems, the data/database resided only on the gate controller or door controller unit itself. To update and maintain that data, the end user had to physically go to that control point/system and manually enter/update the data (typically via a keypad).

More recently, and especially as personal computers and modems have become available and more economic, these access control systems have evolved to allow end users to manage the data/database from a "remote" location, rather than having to go to the controller itself and manually update the data. These improved systems allow the end users to manage their respective database without having to be "at" the access control device (gate/door controller, etc.). Commonly, this was accomplished by including in the remote database management/control system an analog modem at the control point (commonly built into the door/gate controller itself). During installation, the telephone line at the control point (the one that was already needed and used to allow visitors to "call" tenants to obtain entrance to the facility) also is connected to the modem. This arrangement typically allows such systems to provide both the telephone and modem functions on that single line, because the amount of time needed for modem activity over the telephone line (for database maintenance) typically is relatively small. Thus, without adding to the existing monthly telephone line charges for the control system, the end user can enjoy the benefits of remotely managing the database information on the control system.

Persons of ordinary skill in the art will understand that, in such installations, the actual physical distance (or "remoteness") between the gate/door/other controller and the end user's personal computer or other input node can vary greatly, from only a few feet or a few yards to halfway around the earth. Modem technology permits the end user to access the controller (and thereby revise the data on that controller) from anywhere the end user can reach a telephone signal with the end user's own corresponding modem. Among other things, end users could sit in their office or home and use their own modem (the one on or associated with their personal computer) to "dial into" the analog modem at the control point.

Once the modems are communicating with each other, the end user can modify and/or update the database information. Software typically allows the end user to maintain a copy of the relevant data/database information on their personal computer, and to synchronize or otherwise update that data with some or all of the data on the remote control point system. If the remote control point systems also tracked "transactions" that occurred at the control point (data for each entry or exit through that control point, such as the time/date/person passing through, etc.), the modem connection could similarly be used to "synch" or download that data from the remote control point system to the end user's computer (where the end user could analyze or otherwise use it).

Thus, such systems allowed the "end user(s)" or manager(s) to update the data within their database (such as when a former tenant moved out of a building and/or a new tenant moved in), without requiring the end user to manually input/update the data at the control point itself (e.g., go to the gate controller and delete old codes, enter new ones, etc.).

The data communications between the end user and existing gate/door controllers commonly includes at least the following: (1) "uploads" or synching of database changes made by the end user (from the end user's computer to the remote control point system); (2) "downloads" or synching of the "transaction" data to the end user's computer from the remote control point system (for data that is initially gathered and stored by and on the remote control point system); and/or (3) "downloads" or synching of the authorization data (or even the complete data from the database) from the remote control point system to the end user's computer (this is useful, for example, if the end user's local computer crashes and loses its copy of the database, or if a new or additional "end user" needs to have a copy of the data on their own personal computer).

As indicated above, these access control systems typically include a main control unit located at a primary entrance of the facility. Depending on the size of the structure or area being monitored and the use of that area/building, additional remote control units may be provided to control additional remotely located entry points. In other words, particular applications and situations may involve secured buildings or areas having a plurality of controlled access points. Depending on the logistics and economics of any particular installation or application, each access point (gate/door/etc.) can have one or more dedicated control systems/computers.

As noted above, the manufacturer and/or installer of the access point controller system or systems may provide one or more of its own "standard" database programs for the relevant end user(s). This database software typically is installed on the end-user's general purpose computer, and is configured with appropriate data fields and related information to permit desired control and operation of the security system. Commonly, the database "mirrors" the data that is stored on the remote controller units. The end user can readily revise the local copy of the data (on the database on their general purpose computer) and then "synch" that copy with the remote controller (or take some other approach, such as just copying/overwriting the revised data to the remote controller, etc.).

In other applications, users could provide or use their own or third party database software to manage the security access control data for such systems. Examples include personnel databases, tenant databases, custom databases built to interact with the controlled access point hardware and software systems, and others.

As indicated above, however, "remote" control systems such as the foregoing need a way to communicate between the end user's system and the controller box or unit located "remotely" from the end user. Typically, the necessary data update is provided by establishing direct communication between the two analog modems described above. In other words, the end user uses the modem on the user's personal computer to dial directly into the modem on the remote controller. Thus, this typical prior art communication occurs directly over a conventional telephone line, between the (1) user modem, and (2) the controller modem. Once the user has completed the desired communications between those modems, the user terminates the communication link.

For several reasons, setting up and maintaining the desired data/database communication through that conventional pathway ((1) user modem/(2) telephone line/(3) controller modem) can be complicated or at the very least involve a not insignificant amount of manual configuration. This is true for the initial setup of the equipment and any subsequent changes (such as when a user gets a new computer, or adds a computer to use as an alternative user input node). Among other things, at any of those points in time, both the end user's general purpose computer and the associated modem(s) may be any of a wide variety of makes and models. Each of those makes and/or models can require custom settings in order to establish the prior art systems' required direct communication with the analog modems at the control access point(s).

Thus, even if a given gate control manufacturer/installer tries to "standardize" all of its installations/systems around the world (so that they all use only one or a few different models of modems within the relevant remote controller(s)), each installation typically has to be "custom" installed, to be sure that the particular end user's computer/modem can properly communicate directly with the remote controller(s).

As indicated above, there are many different modem manufacturers, and each modem may require different/custom programming in order to facilitate the desired communication. Historically, an end user's general purpose computer typically included a pre-installed modem (which was of unknown origin and characteristics, from the viewpoint of the access control system manufacturer/installer). In addition, however, end users may buy modems independently of their computers, including not just new internal modems but also external modems. Not only do manufacturers/installers have to be prepared to customize their security systems to communicate through the end users' "old" or vintage modems, the systems must work with "new" modems or modem-simulation technology that may come with an end user's new or upgraded general purpose computer. More specifically, many computer manufacturers no longer install hardware modems, but instead use software modems that "simulate" modems.

In addition, the general purpose computer's modem (internal or external) may be used by multiple programs on the computer (such as facsimile programs and/or dial-up Internet access). This multi-use situation can interfere with the necessary communication between the end user's system and the access control system, possibly even leaving the user's modem/computer unusable to communicate with the remote control access system. Adding to the potential problems, noise on the telephone lines connecting the modems can disrupt a modem signal and/or cause data communication errors.

Another issue for communicating using computer analog modems is their relatively slow speed. As general purpose computer users have come to expect faster Internet access (such as through a network-type connection such as DSL or cable), the relatively slow data transmission between analog modems can be frustrating for users.

Being able to quickly and accurately update data within such remote access control systems can be important for a number of reasons. For example, inaccurate or incomplete data for the remote controller can inconvenience many people, and/or adversely affect the security of the controlled location, both of which can negatively impact the user's business and/or personal life in many ways. If the data used to control an access gate or door cannot be reliably and easily updated, for example, the affected tenants likely will grow frustrated by the resulting delays in entering/exiting the premises, and/or may demand or find ways to circumvent the security, or even may decide to cancel or not renew their leases. Therefore, in addition to being a daunting task, reliable and secure and easy data transfer between the end user's computer and the remote access control system can be an important task.

Accordingly, it is desirable to provide methods and apparatus that simplify the transfer of electronic data and/or other information between an end-user's computer and a remote target system such as an access control system for a facility's gate(s) or door(s).

SUMMARY OF THE INVENTION

In a preferred embodiment of the present invention, a system avoids the problems of direct modem-to-modem data communication between an end-user's general purpose computer and a remote target system (such as a modem-based access control system). Preferably, the end user's computer instead communicates through the same channel of communication that it "normally" uses to access the Internet (e.g., cable, DSL, dial-up, other), to a central/main server system. In addition to communications with one or more such end users, the central/main server system preferably is equipped with a pool of analog modems (or other technology by which it can communicate with the relevant remote access control system(s), such as gate or door controllers, etc.). Thus, the central/main server system effectively sits in the "middle" of the communication between the end user's computer and the remote access control system. This permits the end user's system to use "standard" Internet communication hardware/software (eliminating the need for the manufacturer/installer to customize the communication hardware/software/settings on each installation).

The invention also simplifies the communication by reducing/controlling the number/make/models of modems or other hardware/software that are needed to accomplish the related "second leg" of the communication or data transfer (between the central/main server system and the remote access control system(s)). Among other ways, this can be accomplished by the manufacturer/installer providing the central/main server system with its associated one or more modems. In such embodiments, the manufacturer/installer can determine and control not only the make/model of analog modem on the remote controller, but also the modem(s) used in the central/main server system. In other words, the manufacturer/installer controls both ends of the modem-modem communication, reducing or eliminating the need to customize the modem settings on each end user's computer system.

Persons of ordinary skill in the art will understand that, in certain embodiments, the central/main server system in such an approach can be used for multiple, different end users, each desiring to control one or more different remote control access systems. In other words (and subject to bandwidth, processor speed and capacity, and other such limitations), a single central/main server system can function as a common communication link or "middleman" for many different secure facilities and their respective end users. Companies manufacturing and/or installing access control systems no longer will need to customize the end user's modem/computer settings because the end user's computer will not be directly communicating with the remote access control system.

In addition, and depending on the application, the system of the invention can be configured and implemented in a variety of ways. The control data (and even the database itself) can "reside" on any selected combination or sub-combination of several locations: (1) the user's local computer system; (2) the intermediate server system; and/or (3) the remote access controller end system. Regardless of where the data "lives" or resides, any of the other locations preferably can access and use that data and/or database program (via any convenient communication technology), to permit (a) the end user to manage the data and (b) the remote controller to use the data for controlling security and access to the facility.

For example, in one embodiment of the invention, the data/database can be maintained solely on the central/main server system. The end user can log into that system and modify the data as needed, and the remote access controller end system can similarly access the data/database (in real-time, as needed, etc.), as residents/visitors/other persons need to enter and/or exit the facility. For faster performance, the data can be stored on both the central/main server system and the remote access controller end system (and/or on the end user's system(s)). Under any of those scenarios, preferably the data can be synched between those systems automatically or at the end user's command. Among other of the many embodiments of the invention, the data can reside solely on the remote access controller end system (this latter approach might require, for example, that the central/main server system temporarily upload the data from the remote access controller end system, allow the end user to modify and/or use it, and then download it back to the remote access controller end system).

Depending on the application and the economics and other factors, the manufacturer, installer, or other person or company that provides the "main server" function and system described herein may charge separately for that service (and the hardware/maintenance/etc. required for it), may build those costs into its business model, or may take some other approach.

Thus, in a preferred embodiment of the present invention, a landlord, property manager, or other end user can manage the database information (from an application running on their general purpose computer) that runs a target system (such as a door- or gate-controller) by contacting a main server over the Internet. The end user's communication over the Internet can be accomplished in any suitable manner, including without using any analog modem (although a dial-up analog modem can be used).

As mentioned above, in addition to being configured to communicate with end users' general purpose computers via the Internet, the main server also preferably is connected to one or more modems (such as a "pool" of modems). Each of those modems preferably is connected to a telephone line. In such a preferred embodiment, once an end-user's application contacts the main server, the main server system can select from any of the modems in the "pool" (or use its only modem, for embodiments that do not include a plurality of main server modems) to call the selected target system modem and establish a data communication link (or otherwise facilitate the communication).

For embodiments using modems at the remote target system(s), the main server modems preferably are selected and maintained to ensure that they are readily compatible with the target system modem(s). In any case, the preferred main server system approach ensures that, once a modem is placed into service at that main server, there normally will be no need to further configure it, because all of the remote controller modems will already be compatible with it and/or set up to enable the necessary communication. This eliminates the problems described above that can be associated with prior art approaches that involve a random standard computer modem or modems at the end user's computer. As noted above, those prior art end user modems may be incompatible with the remote target system modems or at the very least require extensive/labor-intensive custom programming.

For the purpose of summarizing the invention, certain objects and advantages have been described herein. It is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

These and other embodiments will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

FIGS. 3A-3D show examples of various interactive computer screens of the main server that may be used to monitor the activity of the main server.

DETAILED DESCRIPTION

Embodiments of the present invention will now be described with references to the accompanying figures, wherein like reference numerals generally refer to like elements throughout. The terminology used in the description presented herein is not intended to be interpreted in any limited or restrictive manner, simply because it is being utilized in conjunction with a detailed description of certain embodiments of the invention. Furthermore, various embodiments of the invention (whether or not specifically described herein) may include novel features, no single one of which or combination of which is solely responsible for its desirable attributes or which is essential to practicing the invention herein described.

Although the methods of the invention are described herein with steps occurring in a certain or preferred order, the specific order of the steps, or any continuation or interruption between steps, is not necessarily intended to be required for any given method of practicing the invention.

Figure 1:
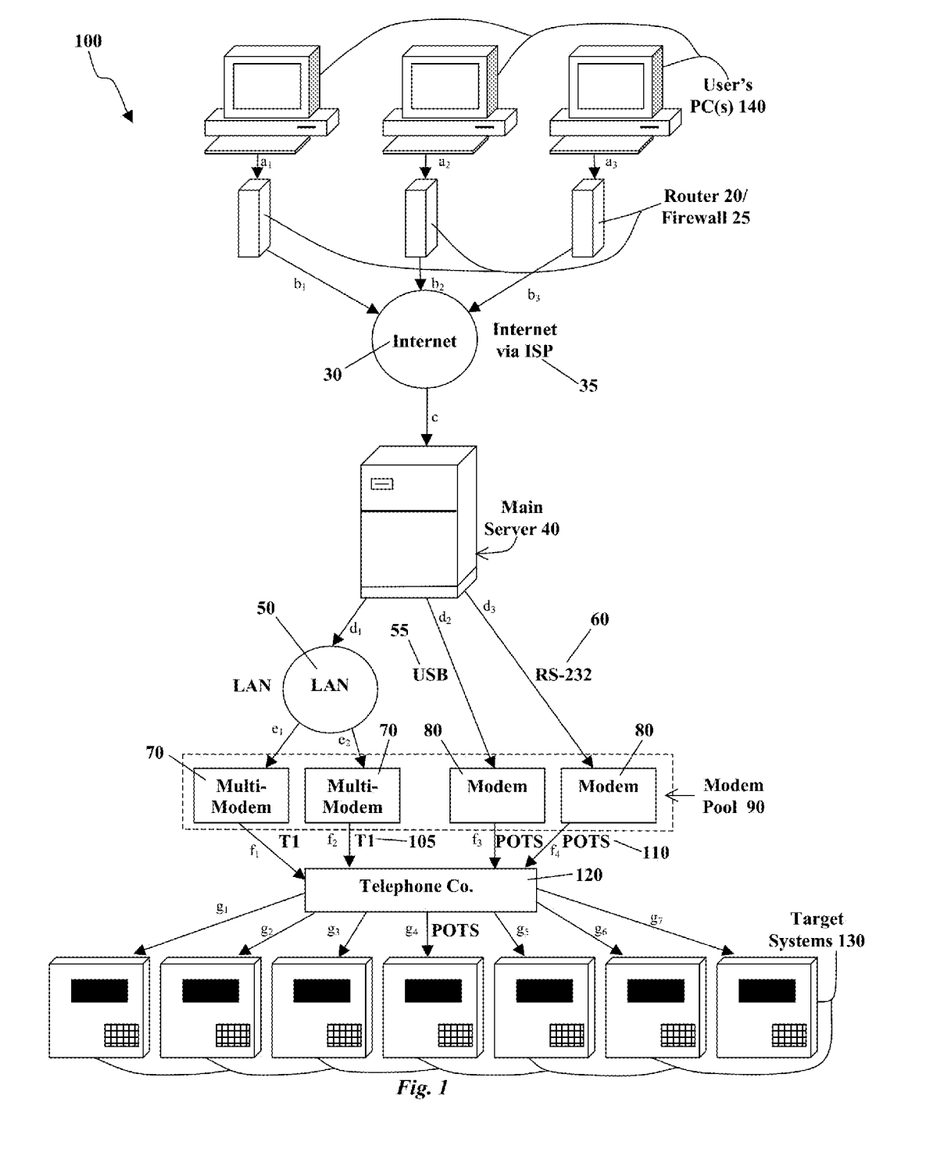
FIG. 1 shows a preferred arrangement of general communication connectivity for a Remote Programming System (herein referred to as the "system") of the present invention.

As shown in FIG. 1, a preferred embodiment of the Remote Programming System 100 of the present invention (herein referred to as the "system") preferably includes, among other things, one or more end user's computer(s) 140, and facilitates simplified data communication between those end user's computer 140 and one or more remote modem-based target systems 130. In one embodiment, that communication occurs between the end user's computer 140 via that user's "normal" Internet connection 30, and at least one main server 40. That main server 40 preferably is associated with at least one modem that in turns communicates with an access control system and/or telephone entry system (TES).

As used herein, "access control system" is intended to include both systems that have a TES and those that do not have a TES. In other words, the present invention can be practiced in embodiments that include a TES and those that do not. By way of comparison, persons of ordinary skill in the art will understand that prior art "TES" systems can function without being an "access control system" as used herein.

Accordingly, various forms of "access control systems" that may benefit from the invention include, by way of example, factories or similar locations that do not need (or have) TES functioning. In such embodiments, an "access control system" can be mounted in a box (adjacent the entry location, or stored somewhere in a closet or other location at the facility), and communicate from that "box" to the gates/doors/etc. being secured by the system. The communication between the "control box" and the secure entry can be provided with wires, wireless connections, or any other suitable means. Similarly, the interaction between the person seeking to pass through the secure entry (at the gate/door/etc.) and the sensor or keypad, etc. that is positioned adjacent that secure entry point can include any of a wide variety of technologies (rolling code receiver, keypad mounted on the wall, proximity sensor, biometric scanner, etc.). Any suitable hardware and software configuration can be used in those portions of the apparatus and methods of the invention, to prevent unauthorized access to the facility.

Even for such installations (ones not having a TES), the access control system typically is connected to a telephone line, to allow a remote user to update and maintain the data/database used by that system. The present invention thus is useful (as a retrofit or as an original approach) even for those applications.

Among the many alternatives for entry control, Bluetooth® or similar "proximity" communication technologies can be used. Because every cellular telephone has a unique identifying number, those handsets that are equipped with Bluetooth® (and have it turned on) can be used to authenticate the person desiring the pass through the secure entryway. If the database is configured to authorize based on those unique identifying numbers, the gate/door/etc. can be opened or unlocked by the system whenever an authorized cell phone gets within the radius of the Bluetooth technology (commonly approximately 10 feet). Such installations would require a Bluetooth-enabled receiver to be located at or near the secured entrance.

Persons of ordinary skill in the art will understand that the specific nature of the data maintained in the database (and communicated between the end user's computer and the remote control point system) can vary and change as new technologies and techniques evolve and are developed. For example, remote video/motion cameras can be stationed at or near the remote control point (such as an access gate or door) and the captured video saved into the "database", wherever that may be located. Among many other examples, an end user could program the database so that, upon the entry or exit of a certain resident, an email alert is sent by the database to the end user or someone else.

In a preferred embodiment of the present invention, the system 100 preferably is scalable. By way of example, if a particular embodiment/installation/application of the invention experiences a "bottleneck" at the main server 40 and/or with the one or more (i.e., a "pool") of modems 90, additional main server computers/systems 40 and/or modems 90 can be added to provide parallel communication paths.

Depending on the particular application, the data and/or the entire database component of the invention can be stored, maintained, and/or synched in a variety of locations and ways. These locations preferably include at least any of the following locations/elements, as well as any combination or sub-combination of these locations/elements: (1) the user's local system; (2) the intermediate server system; and/or (3) the controller end system.

For example, the database of the invention can be maintained in a "single" location (without redundancy at other locations). If that location is the intermediate server system, the end user's system can log into that server (with appropriate security credentials), and revise the data. In such an embodiment, the remote controller unit would not have a copy of the data locally, and instead would also log into the intermediate server system each time it needed to determine whether a user/device/code was authorized. Given current hardware and software and other factors (especially the existing installed units in the field), the speed of that communication from the remote control unit would likely not be sufficiently fast to be acceptable, but systems can be installed in that manner (and may be installed more commonly that way, if other technology improves the speed of that part of the system).

For embodiments in which a copy of the database/data also resides on the remote controller unit, the end user can cause the updated data/database to be sent/copied (by the intermediate server system) to the remote controller unit. Similarly, for embodiments that include a copy/original of the data/database on the end user's system, the end user can "upload" any changes to the intermediate server (after completing those changes on data as it resides on the end user's system). The transmission from the server to the remote controller unit can occur automatically (upon the server sensing that the data has been updated/changed), and/or manually (only upon the command of the end user). Persons of ordinary skill in the art will understand that the intermediate server system can be configured to provide a signal or alert to the end user to confirm that the transmission to/from the remote controller unit has been completed.

Persons of ordinary skill in the art will understand that other of the many alternative embodiments of the invention may transmit only the "changes" to the data (rather than the entire database).

Among the many benefits realized by the present invention, the system 100 eliminates the need for an end user to have (or use) a computer equipped with an analog modem just to communicate with a target system 130. In other words, in the preferred embodiment of the invention, the transmission of the authorization/control data is completed through a pathway other than directly from an analog modem on the end user's computer to an analog modem on the remote controller. That prior art "direct analog modem" connection link instead is replaced by the end user's computer logging into an intermediate database server on the Internet, and that server is connected to its own modem(s) that then accomplishes the communication to the analog modem on the remote controller.

Among other things, the invention thus provides the opportunity for a manufacturer/installer/other person to have more control over (and/or limit the variety of) the hardware and software that is required to communicate with the remote controller. Thus, the problems associated with configuring an end-user's computer-connected analog modem to communicate with a target system are eliminated. In addition, the system 100 of the present invention eliminates the need for a target system vendor to provide to end users technical support for a wide range of computer-connected consumer modems. As discussed, these consumer modems are often difficult to configure for proper communication with the target system, and the preferred system 100 of the present invention avoids this problem.

FIG. 1 shows the preferred process by which the communication between and through various entities and services and entities of the system 100 can be accomplished. As shown, the direction of the arrows (a1, a2, a3, b1, b2, b3 ... g5, g6, g7) indicates a communication from the user's PC 140 (the entity initiating contact) to the target system(s) 130 (the entity accepting that contact and/or receiving the transmitted data or instructions). Persons of ordinary skill in the art will understand that, within the system illustrated in FIG. 1, a plurality of user input nodes (PCs or Macs or other computers/control devices) can be located at a single physical location or at multiple locations. They can even be portable devices, including things such as laptops or Internet-equipped cell phones.

In the illustration of FIG. 1, each of the user nodes/PCs 140 typically is able to communicate with at least a selected one of the corresponding target systems 130. By way of example, the computer 140 communicating along path a1 might be controlling the two target systems 130 that are linked by paths g3 and g6 (those two systems 130 might be a front and back gate of an apartment complex, for example). Another of the computers 140 might be located and/or controlled by some person or company completely independently of that first "a1" controller 140. That second computer 140 might use path a2 to control a second target system 130 along communication path g1. Although FIG. 1 shows three computers 140 and seven target systems 130, the system 100 preferably is modular, so that a wide range of quantities of computers 140 and target systems 130 can be used through a single main server 40.

As indicated above, and among the many alternative embodiments of the invention, certain applications may benefit from using a plurality of main servers 40, providing redundant and/or parallel communication paths between the computers 140 and target systems 130. In a preferred embodiment, and as further discussed below, the analog modem(s) in the preferably centralized modem pool 90 are used by the main server 40 to effectively eliminate the need for any direct communication between the computers 140 and target systems 130.

By way of further example, FIG. 1 illustrates an end user's computer 140 communicating through a router 20 and/or firewall 25 to the Internet 30. Preferably, that communication connects over the Internet 30 to the main server 40. The communication preferably proceeds via any of the indicated paths from the main server 40 to the appropriate target system(s) 130, as shown in FIG. 1. Among other things, the system includes an authorization control to ensure that any particular end user computer 130 is only permitted to communicate instructions or otherwise update data regarding the target system(s) 130 for which they have appropriate permissions. Thus, communications in the present invention preferably are securely controlled.

In effect, the system 100 breaks the communications into at least two "separate" channels: (1) from the end user's computer 140 over the Internet 30 to the main server 40, and (2) from the main server 40 to the appropriate target system(s) 130. Through the combination of those channels, the desired communication occurs between the end user's computer 140 and the appropriate target system(s) 130. Despite that underlying reality, in certain embodiment that have sufficiently fast hardware and software and other components, the end user editing or maintaining the data can be left with the impression of actually being logged "directly" onto the database on the remote controller 130.

At each stage of the communication pathway (such as the pathway illustrated in FIG. 1), the connection link (a1, b1, c, d1, etc.) is initiated by the "entity" shown as "above" in that FIG. 1 and is accepted by the corresponding entity shown as "below" in FIG. 1. Once any of those connection links between two "entities" have been established, data preferably can flow in both directions over that connection.

As illustrated in FIG. 1, the system 100 of the present invention preferably may include some combination of the following:

(1) An end-user's personal computer 140, preferably running an application 145 such as a database program. Such an application preferably is configured with the address of the main server 40 (i.e. the URL of the main server), and with information about the selected target system 130 (such as the phone number of the target system and/or security or other identity information (as examples). The end user's computer 140 is preferably equipped with Internet access, which it uses to contact the main server 40 in order to submit session initiation requests and to check on the status of active sessions on the main server 40.

(2) The user's computer 140 is optionally connected to a router 20 or firewall 25, which typically blocks most incoming connection requests as well as certain outgoing requests. To safely pass through the firewall 25, the preferred embodiment of the system 100 relies only on outgoing requests, and utilizes only standard Internet protocols that are considered safe and thus are not blocked by most firewalls (e.g. HTTP and SOAP). Preferably, the system 100 requires and facilitates standard Internet protocols passing through a firewall when/if a firewall is present.

(3) An Internet connection 30, which preferably is supplied by an Internet Service Provider (ISP) 35.

(4) A main server 40, which preferably accepts incoming Internet connection 30 requests from the end-user's computer 140 after appropriate security checks are completed. As an example, a successful incoming connection may convey a session initiation request, or a session status query if requested by the end user's computer 140. In certain embodiments, such a session status query can consist of serial modem communications activity, which is carried out over a modem from a modem pool 90.

(5) A local area network (LAN) 50 that connects the main server 40 to the networked modems in the modem pool 90.

(6) A modem pool 90 that may consists of any suitable communication device(s), such as a heterogeneous mix of internal modems (not shown) and external modems 80, and multi-modem server units 70. These can be from a single manufacturer or from various manufacturers, and can be all of one model or a mix of models. Preferably, the multi-modem units 70 each contain some number of individually addressable modems capable of dialing out and communicating with the target systems 130 over one or more high-capacity Telephone Company (Telco) connections 120, such as T1 lines 105 (persons of ordinary skill in the art will understand that other communication lines, such as regular telephone lines, can alternatively be used). Preferably, the multi-modem units 70 are connected to the main server 40 by a LAN 50. External modems 80 are typically (but not limited to) standard single-line units, addressable by the main server over some suitable connection (for example, RS-232 60, USB 55, and similar connections), and preferably are connected to the phone system via regular phone lines. Internal modems (not shown) can be used, and also preferably connect directly to a phone line.

(7) A Telephone Company (Telco) connection 120 (e.g., a T1 line 105) which connects any modem pool 90 modem to a target system 130. Outgoing calls dialed by modem pool 90 multi-modem units 70 over the Telco connection 120 go through the phone company to the plain old telephone system (POTS) 110 and ring at the target system's modem's phone number. Internal and external pool modems connect to the Telco 120 switch over a phone line (with or without an intervening private branch exchange (PBX)) and likewise ring up the target system 130 via POTS 110.

(8) A target system 130, such as an access control system, which programmably controls access to secured locations at one or more entry points. When the target system answers a phone call from a modem pool modem 90, a direct communication between that target system 130 and the main server 40 is established.

In one embodiment of the present invention, the system 100 provides a gateway for target system 130 end-users to seamlessly download and upload data, and to download instruction to and from a remote target system 130 containing a standard telephone modem that is accessible only by way of a Telco POTS 110 line with a regular phone number. The system 100 of the present invention utilizes the Internet 30 to improve the imperfect prior art system of programming such modem-based target systems that required an end user to directly dial the modem on the target system 130 using a modem connected to the end-user's computer 140.

According to one embodiment of the present invention, an end-user running an application 145 such as a database program, may initiate one or more communications sessions, each consisting of a particular transaction request, such as a request to upload or download specific data. In this regard, the end-user's application 145 connects to a central main server 40 over the Internet 30 using standard Internet protocols in order to submit the transaction request(s) for processing.

As indicated above, communication sessions between the user's application 145 and the main server 40 are preferably initiated by the user's application (i.e., the system 100 relies on outgoing requests) in order to avoid the complications associated with incoming requests from the main server 40. For embodiments that do otherwise, a non-standard firewall configuration would be required to accept incoming communications from the main server to protect the user's application and computer from possible malicious and/or fraudulent requests. Persons of ordinary skill in the art will understand that incoming requests may be allowed without firewall protection, while still providing many of the benefits realized by the invention (e.g., eliminating the problems of modem-to-modem communication).

In a preferred embodiment of the present invention, the main server 40 may expose a standard SOAP/XML Web Services interface, and the end-user's application 145 may make a call to that interface (i.e., a remote procedures call (RPC)). As it is well known in the art that SOAP/XML is layered over HTTP, the generic Web browsing protocol, the system 100 of the present invention can be practiced with any standard Internet connection without the risk of an outgoing blockage, since any Internet connection that allows regular browsing will allow SOAP/XML as well. Persons of ordinary skill in the art will understand that other similarly permitted Internet protocols may be practiced, and that the system 100 of the present invention is not limited to only the protocols discussed herein.

As indicated above, according to a preferred embodiment of the system 100 of the present invention, an end-user's application 145 connects to a central main server 40 over the Internet 30 using standard Internet protocols. Once connected, the end-user's application 145 submits a request to the main server 40, receives a newly-generated session ID 45 from the main server 40 unique to the particular request, and subsequently disconnects. The end-user's application 145 is able to disconnect from the main server 40 relatively quickly (i.e., within a few seconds) since the modern Internet is significantly fast (and substantially faster than computer-connected analog modems used in prior art systems), and any data that the end-user sends to the intermediate server system 40 is transmitted relatively quickly. Persons of ordinary skill in the art will appreciate that an end-user's application may remain connected to the intermediate host server 40 for any desirable length of time, and still be within the scope of the present invention.

As indicated above, each time an end-user's application 145 connects to the main server 40 and establishes a new communications session with the server, a new unique session ID 45 is provided by the main server to that end-user's application 145. This session ID 45 can be, by way of example but not by way limitation, an arbitrary sequence of letters and numbers that are guaranteed to be different from any other current or archived end-user's session's session ID 45 on a particular main server 40. Since the main server 40 is preferably capable of establishing communication sessions with multiple end-user's applications at one time, the session ID 45 enables an end-user to track the progress of a particular request (communications session) and also allows server maintenance technicians to view active or archived sessions on the main server 40.

Preferably, the main server 40 accepts the request of the end-user's application 145, initiates a new communications session and associates it with a new, unique session ID 45, and sends that new session ID 45 back to the end-user and queues that communications session for execution. In a preferred embodiment 100 of the system of the present invention, the main server 40 is capable of monitoring the status of target systems 130 and availability of modems in the server's modem pool 90. For example, if a particular target system's phone number is not currently being used by another session (as identified by a session ID 45), and the server's modem pool 90 has an available modem (i.e., a modem that is not busy) then the server 40 will assign an available modem to the new session, and that new session is executed immediately. In the alternative, if the phone number of a target system 130 is currently being used by another session and/or if there is not an available modem in the server's modem pool 90, then the server 40 queues the new session for execution once the target system's phone number and/or a modem becomes available. The server 40 preferably queues the sessions for execution on a first-in-first-out (FIFO) basis so that sessions are executed in the order in which they were requested by end users. In addition, when a session is completed, the assigned modem is preferably idled, and the main server can return that modem to the server modem pool 90 for use in a subsequent session.

Preferably, the system 100 of the present invention enables the main server 40 to establish simultaneous active communications sessions with multiple end-user applications. Persons of ordinary skill in the art will understand that the number of connected physical modems can be adjusted based on the number of active sessions desired. Subject to limitations such as computer memory, the number of sessions that may be queued on the main server (to be engaged when a modem becomes available) is virtually unlimited. As noted above, if necessary, additional servers 40 can be implemented to improved the speed, performance, redundancy, or other aspects of the system 100.

According to a preferred embodiment of the present invention, session execution begins when a target system 130 is dialed over a modem from the main server's modem pool 90. Since such "dial-up" attempts have been known to fail (for any of several reasons), the system 100 of the present invention is preferably capable of re-trying to contact the target system 130. The system 100 may be configured to re-try one time, multiple times, or when specified conditions are met. Once a modem pool modem establishes contact (i.e., a modem carrier signal) with the target system 130, and security and/or identity checks of the target system are passed, the transactions which were requested by the end-user's application 145 are performed and the results of that request, such as status information and data (to be downloaded by the end-user's application from the target system), for example, are stored on the main server 40 for subsequent retrieval by the end-user's application 145.

In one embodiment of the present invention, the end-user's application 145 may disconnect from the main server 40 once a transaction request is submitted and a new session ID 45 is received from the main server. In this regard, the system 100 of the present invention enables the end-user's application 145 to periodically re-connect with the main server 40 in order to check the status of the session as identified by a session ID 45. When the main server 40 indicates that the status of a session is finished, the end-user's application 145 can retrieve the completion status and any uploaded data from the main server 40. At this point, the communications session is officially ended since the end-user's request was completed.

Once a session is ended, the main server 40 preferably deletes and/or archives any session-related data, and the end-user' application preferably deletes the session ID 45 from its list of active sessions. Persons of ordinary skill in the art will understand that a session can remain "active" for any prescribed period of time, if desired, and is not limited to ending when a particular request is completed. Persons of ordinary skill in the art also will understand that, in alternative embodiments, the system 100 can keep a copy of some or all of the data/databases (although that obviously would require substantially more information storage capacity, such as hard drive/server space, etc.).

According to one embodiment, the system 100 of the present invention enables an end-user's application 145 to run continuously while seamlessly transferring (i.e., sending or receiving) data to and from a target system(s) 130. In that regard, an end-user may continue to work in the application 145, by adding and removing data, for example, while simultaneously transferring data to and from multiple different target systems 130. Preferably, the system 100 of the present invention allows a user to conduct both tasks concurrently such that one task does not interfere with the other (i.e., a user can access application data and information about a session at the same time).

Figure 4A:
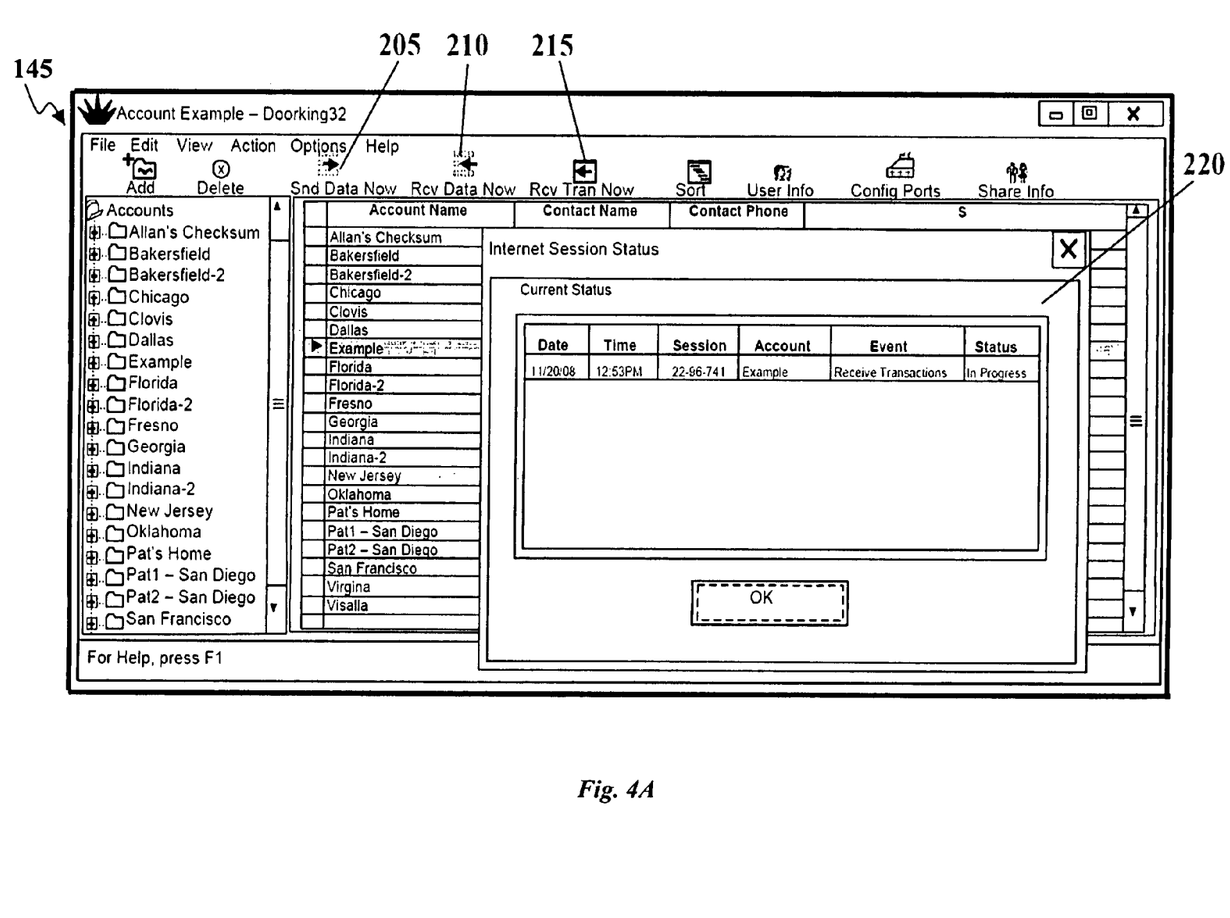
FIG. 4A shows an example of an interactive screen of a user application.

In an alternative embodiment of the present invention, when an end-user's application requests that data be transferred to or from a target system, that particular data is "locked" in a "read-only" mode while it is being used (i.e., downloaded to or uploaded from the target system) by an active session, and cannot be changed by an end-user during that time. As shown in FIG. 4A on an interactive screen of an end-user's application 145, such "locking" may be visually presented to an end-user by selectively highlighting data that is locked until the session that is using that data is completed. In that regard, data integrity is maintained during the download or upload process. If a user desires to update that "locked" data once the session is complete, they may request another transaction in a new session. Persons of ordinary skill in the art will understand that alternative modes may be provided during the data transfer process to protect the data being transferred.

In a preferred embodiment of the present invention, the system 100 enables an end-user's application 145 to submit multiple requests and have multiple active sessions at the same time. Preferably, there is virtually no limit on the number of requests and active sessions a user may initiate at any given time. The system 100 provides the main server 40 to detect and resolve any conflicts with target system 130 phones numbers, such as if multiple requests are made to the same phone number at the same time. As an example, if two or more requests are submitted for the same target system 130 phone number, whether the requests were made by the same end-user application 145 or by different end-user applications, the main server 40 will queue the requests and execute them one-by-one on a FIFO basis.

According to a preferred embodiment of the present invention, the end-user's application 145 and the main server 40 are loosely-coupled so that an end-user may elect to close the application 145 and/or to disconnect from the Internet 30 at any time after submitting a session request without terminating that request or impacting the data. In this regard, an end-user may disconnect before retrieving the final status of a session (i.e., before the official end of a session). Preferably, the system 100 of the present invention enables the main server 40 to retain all the results of a session for a configured length of time (preferably several days) once the execution of that session has completed, thus allowing the end-user to run the end-user's application 145 at a later time (within that data retention period) and retrieve the session's final status and requested data.

In a preferred embodiment of the present invention, the system 100 preferably works over standard consumer ISP connections 35. In this regard, features of the connection between an end-user' application 145 and the main server 40 enable this improvement over prior art systems. First, connections between the end-user's application 145 and the main server 40 are preferably initiated by the end-user, and utilize standard Internet outgoing (e.g. browsing) protocols that preferably pass through standard consumer firewalls/routers. In addition, those connections between an end-user's application 145 and the main server 40 are preferably brief, lasting seconds or minutes, for example. Further, if a connection is lost due to, for example, the end-user disconnecting or problems with an Internet service, the end-user's application's session submission or acquisition of session results is merely postponed until the connection is re-established, rather than failing to execute.

Figure 2A:
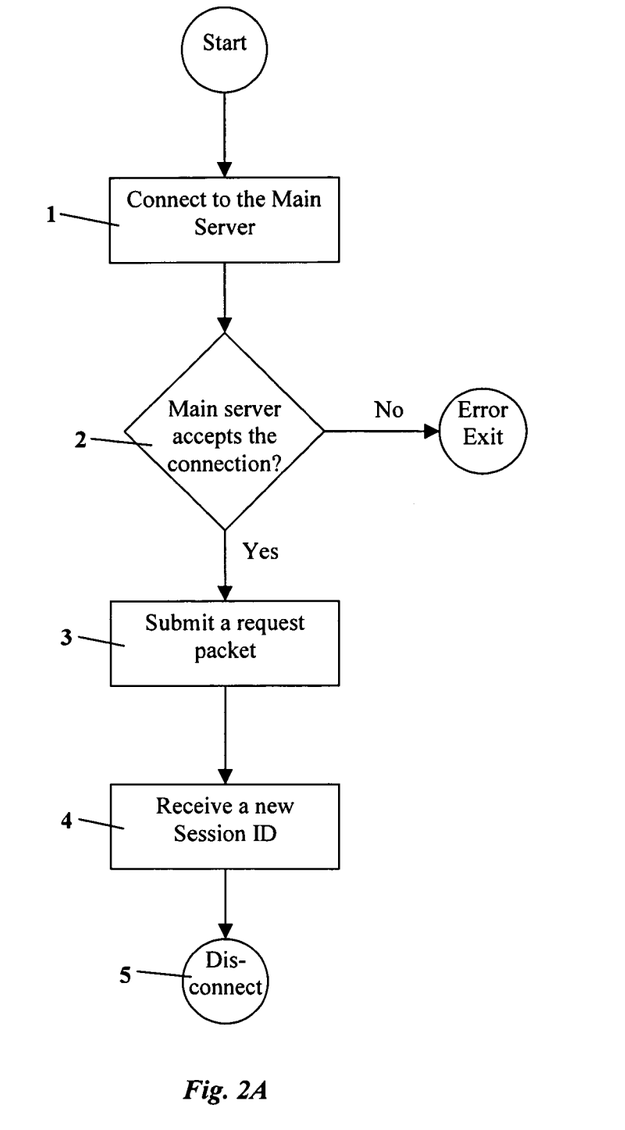
FIG. 2A shows a preferred sequence of interactions between a user application and a main server, such as when the user contacts the server to submit a request.

As shown in FIG. 2A, a preferred sequence of interactions between an end-user's application 145 and main server 40 for a given session starts when the end-user's application 145 contacts the main server 40 to submit a request. Preferably, the following typically occurs:
 1. The end-user's application 145 issues an Internet Protocol Suite (TCP/IP) connection request to the main server.
 2. The main server 40 accepts the connection request.
 3. The end-user's application 145 submits a request packet specifying the desired action, for example a data upload or a request for specific data from a target system 130, and specifying details of the target system, such as the phone number or other identifying information.
 4. The main server 40 provides the end-user's application 145 a newly-issued session ID 45 for the communications session.
 5. The end-user's application 145 adds the session ID 45 to its active-session list and disconnects from the server 40.

As described above, the main server 40 then begins processing and executing the session, ultimately communicating with the target system 130 via a modem from the modem pool 90, while the end-user's application 145 waits for the results. Periodically while the session is in progress, preferably every few seconds, the end-user's application 145 may contact the main server 40 and request the status of the modem communication session identified by session ID 45. When the main server 40 indicates that a session is complete, that session is preferably terminated and the end-user's application 145 ceases polling the main server 40 for the status of that session.

Figure 2B:
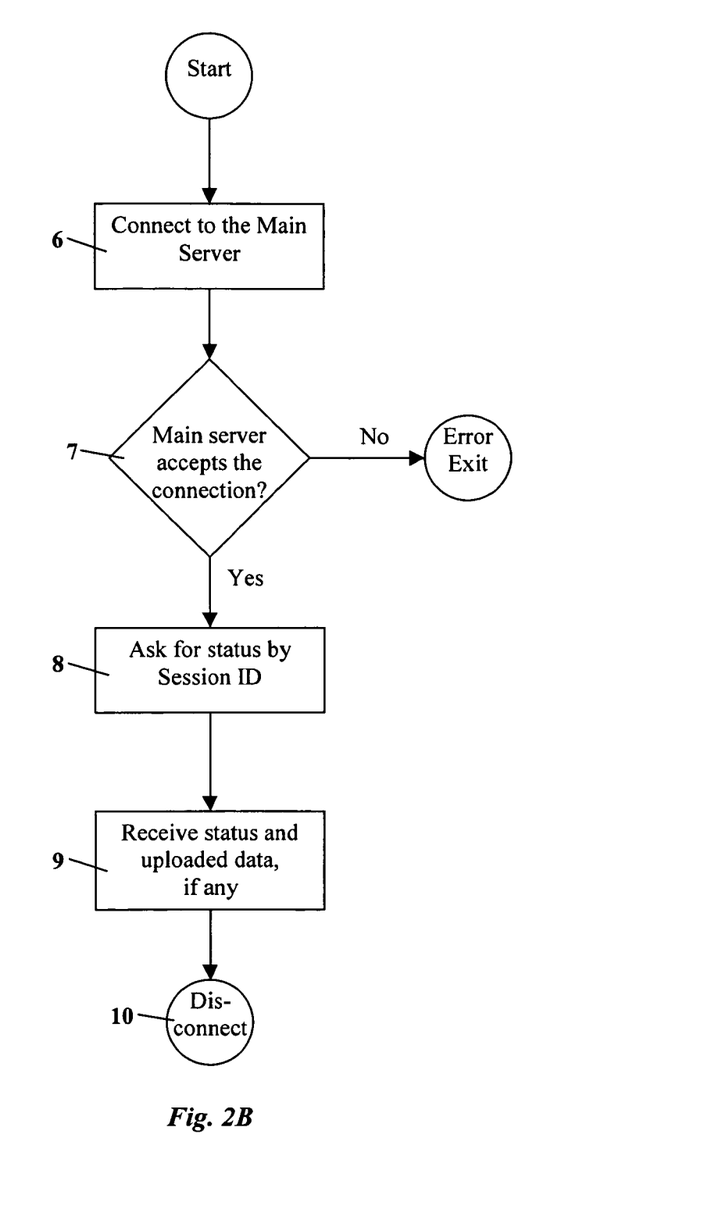
FIG. 2B shows a preferred sequence of interactions between a user application and the main server, such as when the user polls the server for status.

FIG. 2B shows a preferred sequence of interactions between an end-user's application 145 and the main server 40 when the end-user's application 145 periodically polls the server for session status. Preferably, each status-polling contact occurs as follows:
 6. The end-user's application 145 issues an Internet Protocol Suite (TCP/IP) connection request to the main server.
 7. The main server 40 accepts the connection request.
 8. The end-user's application 145 submits a status query packet specifying the particular session ID 45 of interest.
 9. The server 40 provides the status of the specified session to the end-user's application 145 and the end-user's application 145 then disconnects from the server 40.
 10. The status may indicate that the specified session is in progress or complete. When a completion status is received by the end-user's application 145, the session is preferably finished. At that time, the main server 40 archives the session log and the end-user's application 145 archives the session log and processes the uploaded data if any data was uploaded.

In a preferred embodiment of the present invention, more than one session may be in progress at one time and persons of ordinary skill in the art will appreciate that there virtually is no limit on the number of sessions an end-user's application 145 may run simultaneously.

According to a preferred embodiment of the present invention, the main server 40 and its associated modem pools 90 may be physically placed at the facilities of a vendor of one or more target systems 130, or in any location with Internet 30 and Telephone Company 120 connectivity. Preferably, the system 100 of the present invention provides for access to a main server's software, such as monitoring, maintenance, troubleshooting and control functionality, over a network through a standard Web site. Thus, this main server accessibility of the system 100 enables personnel who require access to the main server, such as technical support persons, access to the main server from a remote location. This feature of the system 100 of the present invention, provides many benefits, including the ability to monitor and control the main server from any location where Internet connectivity is available.

Figure 3A:
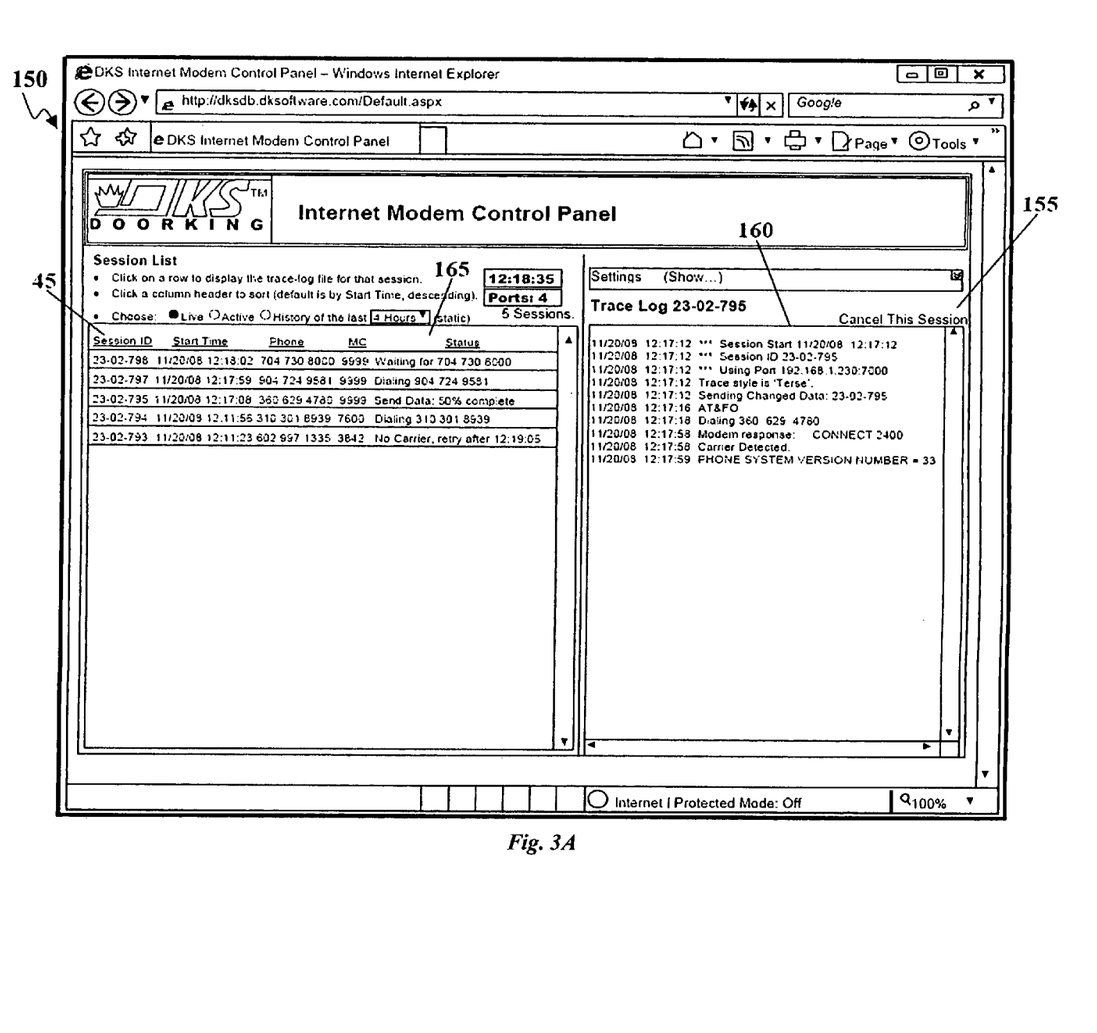
Figure 3C:
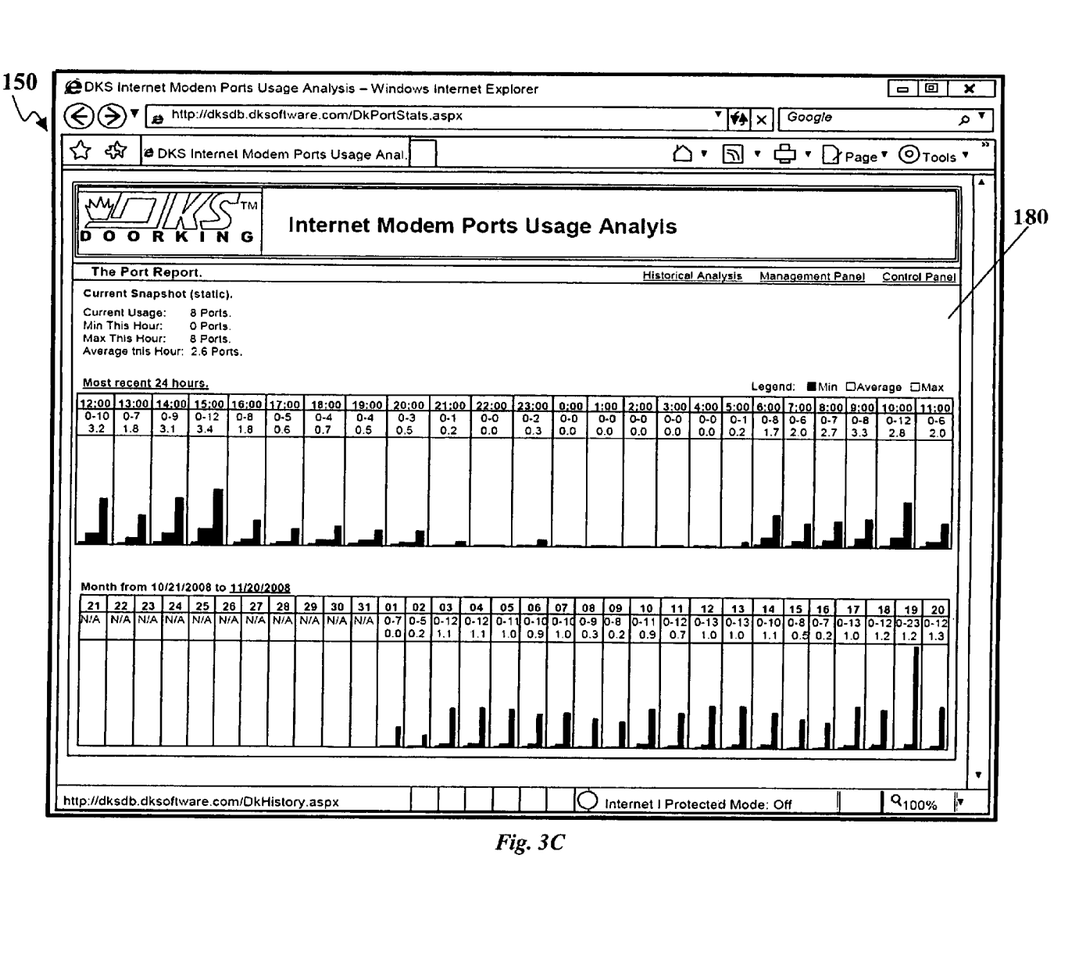
Figure 3D:
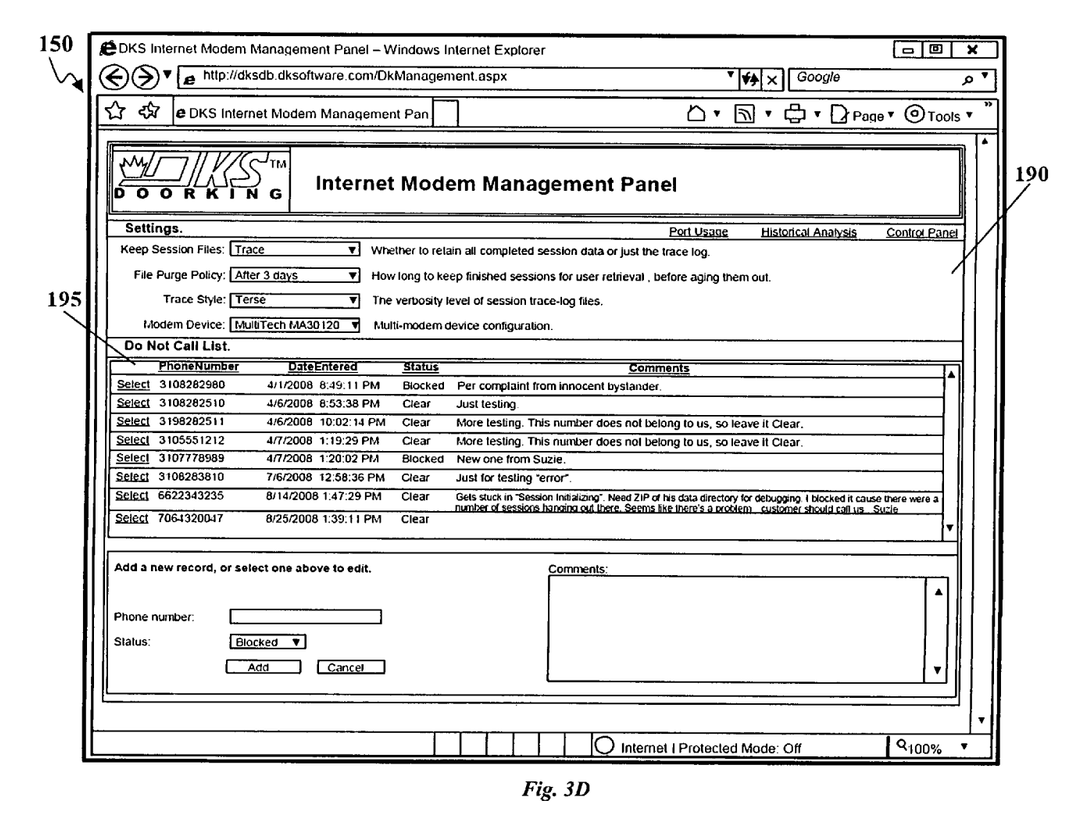

As illustrated in FIGS. 3A-3D, a Web site interface 150 may be provided through which server personnel, such as technical support persons, can access the main server 40. This Web site interface 150 allows server personnel to control the main server from a remote location. Among others things, server personnel may: (1) monitor all main server activity in real time (FIG. 3A); (2) obtain various status and usage analysis reports (FIGS. 3B and 3C); (3) configure server settings such as trace levels, archiving policy, and other similar settings (FIG. 3D); (4) maintain a do-not call list to handle potential "prank" callers (FIG. 3D); and (5) cancel sessions in progress if necessary. Persons of ordinary skill in the art will understand that server personnel may be provided with other server monitoring, maintenance, and control functions that can be presented through a Web site interface.

Persons of ordinary skill in the art also will understand that, in other alternative embodiments and as further described below, one or more similar Web site interfaces may be provided to permit end users to log into the main server, rather than having a separately installed database application 145 on the end user's system. In such embodiments, the end users would not have a "local" copy of the database on their own system, and the intermediate communication server system would require additional storage memory to maintain the database information (rather than discarding it at a prescribed interval after completion of each session). Thus, instead of the server 40 only being used as the "go between" for the end user PC 140 and the entry system 130, the server 40 can host the database for the end user. Under such an approach, the end user would log onto the server 40 using any standard browser, and would maintain the database over the Internet. For security and other purposes, an account would be setup so that the end user would need a password to log onto the server 40 and into the end user's account.

FIG. 3A shows a screenshot of a real-time main server monitoring control panel 155. As shown, each row on the left hand side of the screen represents one session from a list 165 of all live (5 in total) communication sessions (alternatively, all active sessions may be displayed or a history of all sessions within a selected period of time may be displayed). In the embodiment illustrated in FIG. 3A, the session ID 45, start time, phone number of the target system, and status of each session are presented. By clicking on a selected session from the list of communication sessions, the right hand side of the screen will display the trace log file 160 for that session. In the example shown in FIG. 3A, session ID 23-02-795 is selected. The trace log file 160 displays detailed information about the selected session. In addition, personnel can select to cancel a selected session by clicking on "Cancel This Session". Further, as shown in the last session listed (session ID 23-02-793), the main server monitoring control panel shows the status as "No Carrier, retry after 12:19:05" to indicate that there is no available modem to call the target system, and that this session is queued to retry at a later time.

As shown in FIG. 3B, in certain embodiments of the invention a main server historical session analysis feature 170 may be provided. Various sorting and filtering features may be provided which personnel may use to retrieve, arrange, and report session history. As shown, 457 session records are displayed for one date. Each row on the screen represents one session from the list of session records 175. Information about each session that is displayed includes the session ID 45, session start time, the phone number of the target system, the type of transaction requested (i.e., send/receive data to/from the target system), session status, session end/completion time, and retrieval time (i.e., when the end-user's application retrieves the session status and/or requested data).

FIG. 3C shows a screenshot of a main server port usage report 180, one of a wide variety of reports that can be provided by the present invention. This report may be used by personnel to monitor the server's modem pool 90 load. As shown, daily (i.e., by the hour) and monthly (i.e., by the day) reports can be generated for any specified date.

As shown in FIG. 3D, embodiments of the invention also may include a main server configuration management panel 190. Among other features, such a panel 190 may permit personnel to maintain the main server configuration and/or a do not call list 195. As shown at the top of the screen, personnel may select whether to retain all completed session data or the trace log, how to keep completed sessions for retrieval by end-user's applications before aging them out, and the verbosity level of the session trace log files. Also, personnel may select a desired multi-modem device configuration.

As mentioned above, in certain embodiments, personnel may maintain a "do-not call" list 195 from this panel 190. As shown on the bottom half of the screen of FIG. 3D, certain target system 130 phone numbers can be added to the list if, for instance, a particular phone number presents a problem when a server 40 modem attempts to call it. In addition, personnel preferably can choose to block or allow a particular number on this list as needed, and for a specified amount of time. In a preferred embodiment, the system 100 of the present invention may allow a selected number of erroneous attempts to call a target system 130 before temporarily disabling a specific phone number for a specific period of time. Preferably, if a server 40 modem attempts to call a target system 130 phone number unsuccessfully a selected number of times, that phone number may be automatically or manually placed on the do-not call list 195 for a specified amount of time. Thus, when the main server 40 receives a request to access a target system 130, the phone number of that target system may be checked against the do-not call list 195, and if the number is located on the list, that phone number will not be called until it is no longer on the list.

As mentioned above, and according to a preferred embodiment of the present invention, an end-user's application 145 may be provided with an interface that enables end-users to submit session requests and monitor the status of their active sessions. As shown in FIG. 4A, a screenshot of an end-user's application 145 following the submittal of a session request, shows the session ID 45 (i.e., 22-96-741), the current status of that session (i.e., "In Progress"), the account associated with that session (i.e., "Example"), and the event (i.e., "Receive transaction") in a status window 220. In addition, an end-user can cancel an active session prior to its completion by selecting that option from the "Action" menu.

As further shown in FIG. 4A, an end-user may initiate a request by selecting an account from the application 145, and choosing "Snd Data Now" 205 (to send data from the end-user's application to a target system), "Rcv Data Now" 210 (to retrieve data from a target system), or "Rcv Tran Now" 215 (to receive a transaction from a target system). Persons of ordinary skill in the art will appreciate that an end-user's application 145 may be provided with various features, many of which are not shown, which enable improved management of information, such as database information.

In accordance with a preferred embodiment of the present invention, an end-user's application 145 may request to receive a transaction(s) from a target system 130. In this regard, each time that a transaction is received by an end-user' application 145, the application 145 may automatically create a new file name for each transaction and store the transaction data under that new file name. Preferably, the transactions may be stored in an end-user's application 145 corresponding to the target system 130 from which they were received.

In an alternative embodiment of the present invention, a vendor of the system 100 of the present invention may elect to limit usage of the system 100 by various means, such as by requiring end-users to register and/or by charging an end-user a fee for using the system (by way of example but not by way of limitation). In that regard, the system 100 may incorporate any suitable mechanism to secure end-user access to the main server 40 and to track an end-user's usage of the system 100.

In one embodiment of the system 100 of the present invention, an end-user's application 145 may be required to supply valid login credentials (for example, a user name and password) at the start of any interaction with the main server 40.

An access attempt that is originated by an unauthorized user may be rejected and/or recorded in a security log provided on the main server 40. In addition, security may be provided by configuring the main server 40 to only attempt connection requests using secure communications schemes, such as Secure Socket Layer (SSL) connections, for example.

In a preferred embodiment of the system 100 of the present invention, the main server 40 can maintain a record of all sessions initiated by each end-user in a master "database" of the system 100 (as contrasted with the data/databases of the end users, corresponding to the remotely controlled systems 130). This master database record can include time, data volume, and other utilizations metrics, for example. Preferably, the records are used to track and optionally charge an end-user for their activities on the system 100. End-user charges may be applied on a flat-fee subscription basis, a per session basis, by time or data volume, or any combination of these and other factors, such as by target system characteristics, for example.

In an alternative embodiment of the system 100 of the present invention, an end-user may register on the system 100 to be allowed access to the main server 40. End-user registration may be provided to restrict access and to track access, for example, of an end-user's activity on the main server 40. Preferably, an end-user's application 145 can be configured to perform the registration procedure. The registration procedure can include entry of identifying details, such as a credit card number, PIN, or password (for example), as well as target-system information such as telephone numbers and access codes, and submission of this information to the main server 40. Alternatively, registration may be performed through a conventional Web site, or any other acceptable means. In any case, end-user registration enables tracking and billing of end-user's by access count, resource utilization, target system characteristics, and any combination of these and other means.

As indicated elsewhere herein, some of the many alternative embodiments of the invention may capture other data associated with ingress/egress/access to the facility, and communicate that data within any of the various database arrangements and communication systems discussed above. By way of example and not by way of limitation, one or more video cameras and/or audio recorders can be provided to capture video/sound at the access point, and that captured data can be added to and maintained and used within the context of a "database" as described herein. Many other functions can be incorporated within various applications of the system, such as automatically generating an email message or other alert upon the occurrence of certain events (such as the facility manager leaving/arriving, etc.).

In an alternative embodiment of the present invention, a vendor may configure the system 100 for unrestricted access to all end-users, and an end-user's application 145 may supply "guest" account credentials when accessing the main server 40.

Although in certain embodiments, the main communication server functions (receiving files from the end user's PC and modeming them to the entry control system 130 using one or more analog modems) can be provided at "no separate charge" to the end user, end users can be charged for these services. Among other things, this would provide a more direct economic connection between the end users and the costs of providing and maintaining the server 40, and also for the modem phone calls from the server 40 to the entry systems 130 across the country.

Among a variety of approaches, the server 40 can be configured to require an end user to set up an account prior to the user being able to use the server 40. This account could be charged to a credit card or the user could be billed periodically (such as monthly or yearly).

Another economic model would for a manufacturer/vendor (of the remote control systems 130) to give a discount for the server's service to that manufacturer/vendor's authorized dealers. Under such an approach, those authorized dealers could charge their customers (the actual end users) to use the manufacturer/vendor's server 40 and the manufacturer/vendor could bill the authorized dealer. Among other things, this approach would provide some incentive for the dealer to promote the service (it would increase the dealer's revenues).

In certain embodiments, the costs and/or other charges for operating and providing the service of the invention can be passed on to the end users in a wide variety of ways and/or under a range of alternative payment plans. The charges can be allocated or otherwise reflect the particular application and/or usage plan selected by the user (whether the end user wanted the server 40 to host that user's database, how often the end user used the service, etc.). By way of examples, such payment plans could include:

a. a flat monthly fee for unlimited use.

b. a per use basis in which every transfer of data is charged a small fee.

c. a combination of the above methods so that heavier users would pay more.

d. an additional charge if the user elects to have the server 40 host that user's database.

After the end user finishes updating the database, the intermediate server 40 can transfer the data to the entry system controller 130, via the pool of modems as per above or by any suitable means. By way of example, for embodiments in which a remote controller entry system itself has Internet communication capability (that can upload/download to a server 40 by some means other than an analog dial-up modem), the transfer between the server 40 and the entry system 130 can occur over the Internet (rather than via a modem-modem session as described above). Charges for that Internet communication capability can be allocated according to one of the cost/payment models described above, or in any suitable manner.

The apparatus and methods of the present invention have been described with some particularity, but the specific designs, constructions, and steps disclosed are not to be taken as delimiting of the invention. Modifications and further alternatives will make themselves apparent to those of ordinary skill in the art, all of which will not depart from the essence of the invention and all such changes and modifications are intended to be encompassed within the appended claims.

What is claimed is:

1. Apparatus, including:
    a plurality of telephone entry systems (TES) each near an entrance to a physical location, each of the TES including at least one analog modem;
    a plurality of end user systems each having a non-analog communication link to the Internet, each end user system corresponding to at least one of the physical location entrances; and
    at least one intermediate communication system linking (a) the plurality of end user systems via the users' respective non-analog communication link to the Internet, with (b) the TES at the corresponding entrance, said intermediate communication system including at least one analog modem remote from the TES and remote from the end user systems, said intermediate communication system providing communication between the corresponding pairs of TES and end users.

2. Apparatus, including:

a plurality of secure facilities, each having at least one entrance;

an access controller corresponding to and at least partially located adjacent to each such entrance, the controller configured to allow passage through the entrance based on information within an electronic database, each such controller including its own at least one analog modem for communicating information relating to the database;

a communication server remote from the secure facilities and having a plurality of analog modems for communicating information relating to the database with the respective access controllers' modems at the secure facilities, the communication server remote from the secure facilities also having at least one non-modem Internet communication link and having means for communicating between the non-modem Internet communication link and the communication server's analog modems;

a plurality of end user systems each corresponding to at least one of the plurality of secure facilities, each end user system having at least one non-modem Internet communication link capable of directly communicating information relating to the database with the communication server.

3. The apparatus of claim 2, including:

a payment system by which end users register for and pay for use of the communication server.

4. Apparatus, including:

A plurality of access control systems, each configured to control entry to a respective secure location based on information within an electronic database, each access control system further having at least one analog modem located near an entrance of the secure location for communicating information relating to the database;

a plurality of end user systems, each corresponding to at least one of the respective secure locations, and each having a non-analog-modem means for communicating over the Internet;

an intermediate communication system remote from the end user systems and the secure locations, the intermediate system having (a) means for transmitting information to and from the end user systems via the users' respective non-analog-modem means, and (b) a plurality of modems for related transmission of that information between the system and the analog modem or modems in the respective access control systems that correspond to the specific end user system.

5. The apparatus of claim 1, wherein said at least one analog modem of the intermediate communication system communicates with the TES's at least one analog modem over a telephone network.

6. A method of electronically communicating information for controlling access to a plurality of secure locations, including the steps of:

providing an intermediate communication system for communicating with a plurality of end user systems and with a corresponding plurality of secure locations, each of the secure locations having at least one analog modem, the intermediate system remote from the secure locations and including a plurality of analog modems for communicating with the secure location modems, the intermediate system including non-analog-modem means for communicating with each of the plurality of end user systems;

communicating with a plurality of end user systems using the non-analog-modem means; and communicating with the secure location modems using at least one of the plurality of analog modems.

\* \* \* \* \*